March 29, 1966     S. L. LINDT ETAL     3,243,241
LUBRICATING SYSTEM FOR DYNAMOELECTRIC MACHINES
Filed Dec. 26, 1963
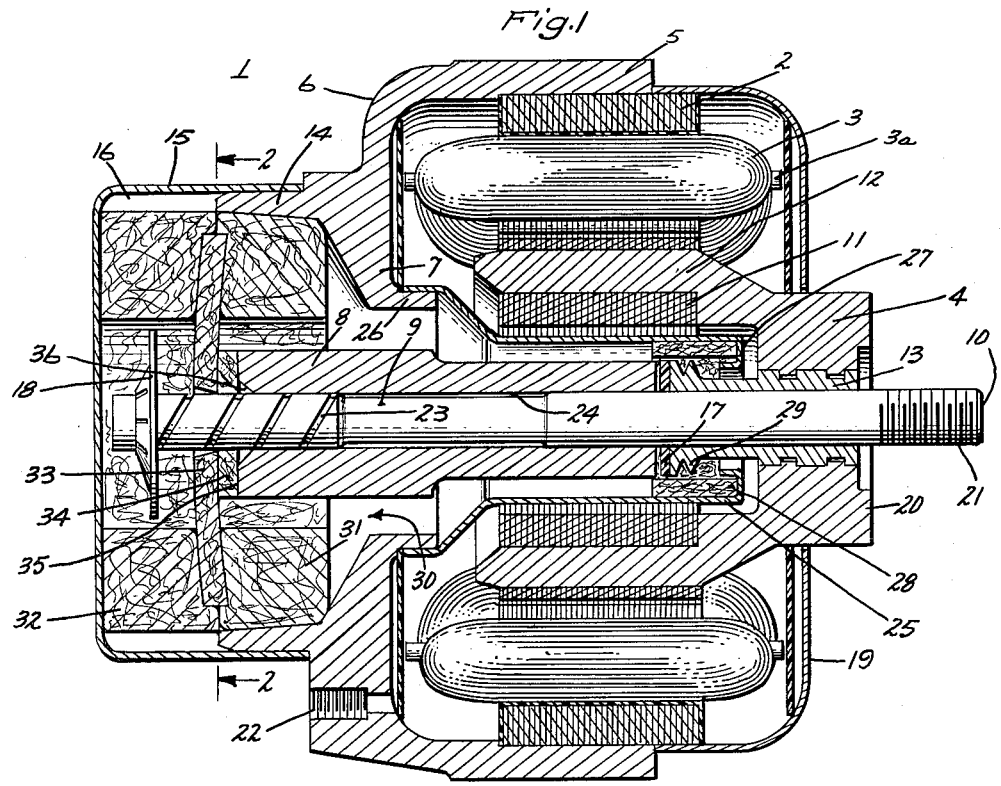
Fig.1
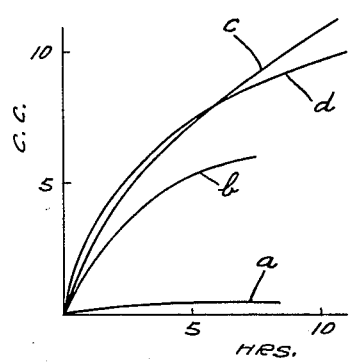
Fig.2
Fig.3
Inventors:
Stanley L. Lindt,
Harry R. Baker,
by Edward J. Hanson
Attorney.

United States Patent Office 3,243,241
Patented Mar. 29, 1966

3,243,241
LUBRICATING SYSTEM FOR DYNAMOELECTRIC
MACHINES
Stanley L. Lindt, Fort Wayne, Ind., and Harry R. Baker, Jonesboro, Ark., assignors to General Electric Company, a corporation of New York
Filed Dec. 26, 1963, Ser. No. 333,342
6 Claims. (Cl. 308—78)

This invention relates to lubricating systems for use in dynamoelectric machines and more particularly to a wicking arrangement for continuously supplying lubricant to a bearing throughout the life of the machine.

A principal object of this invention is to provide a new and improved lubricating system for dynamoelectric machines.

A further object of our invention is to provide a new and improved lubricant conducting wick feeding arrangement for use with the bearings of dynamoelectric machines.

Still another object of our invention is to provide an improved lubricating system which is simple to assemble, dependable in use, and economical to manufacture.

Briefly stated, in accordance with one form of our invention, we have provided a new and improved reservoir and feeding wick arrangement for motor shaft bearings wherein the lubricant is fed to the bearing from one end of the bearing. By our invention a wicking washer is positioned around the shaft and engaged against the end of the bearing. This wicking washer is also engaged against the shaft. A second wicking washer having a greater diameter than the first wicking washer engages a portion of the first wicking washer on its face opposite the end of the bearing. A reservoir wick is pressed against the face of the second wick opposite the first wick. This reservoir wick is spaced entirely outwardly from the edges of the first wick and presses against the outer regions of the second wick, radially beyond the first wick, thereby pushing the outer ends of the second wick inwardly, i.e., toward the end of the bearing. This draws the first wick into pressing engagement against the end of the bearing about the shaft. The first and second wicks are pressed tightly together and this results in the very efficient feeding of the oil in the reservoir wicks to the bearing journal surfaces.

The subject matter which we regard as our invention is particularly pointed out and distinctly claimed in the concluding portion of this specification. Our invention, however, both as to organization and method of operation, together with further objects and advantages thereof, may be best understood by reference to the following description taken in conjunction with the accompanying drawing in which:

FIG. 1 is a side elevation section, illustrating a unit-bearing motor having the improved reservoir and feeder wick arrangement;

FIG. 2 is a section taken along line 2—2 looking in the direction of the arrows, stepped to the right along the inner surfaces of the wicks to include the right hand feeder wick in the section and with the section being partly broken away; and FIG. 3 is a graph showing the relative pumping characteristics of the motor of FIG. 1 in horizontal and in vertical operation and of the motor of FIG. 1 modified by the removal of wick 34 and operated in horizontal and vertical positions.

Referring now to the drawing, there is shown a motor 1 having a stator core 2 formed of laminated magnetic material. A field exciting winding comprising a plurality of coils 3 is wound on the stator 2 and energized from a suitable source of power to operate the motor. Winding pins 3a both hold the laminations of the core together and the turns of the coil clear of the rotor 4. The core 1 is mounted in a stationary frame 5, which may be formed of cast iron or die cast aluminum, and which extends as an end shield 6 at one end of the machine. The frame is provided with a web portion 7 formed integrally with the end shield portion 6 and having a bearing 8 secured thereto. The bearing 8 rotatably supports a shaft 9 which is provided with an extension 10 projecting beyond one end of the bearing.

The rotor 4 has a core 11 formed of laminated magnetic material and a conductive squirrel cage 12 which is carried by the core. The rotor is secured to a rotor mounting sleeve 13 which in turn is secured on the shaft extension 10. The web portion 7 of the frame is provided with an outwardly extending annular flange portion 14 on its side remote from the shaft extension 10. A cover member 15 is secured to the free end of the annular flange portion 14 as seen in FIG. 1. The cover member 15 forms with the flange portion 14 and the web portion 7, a lubricant retaining cavity or reservoir 16 at the end of the bearing 8 remote from the shaft extension 10. A thrust washer 17 may be seen between the rotor sleeve portion 13 and the adjacent end of the bearing 8. A retainer 18 is disposed at the end of the shaft 9 opposite the shaft extension 10 to retain the shaft in the bearing should the motor be completely inverted prior to installation. The particular motor shown is intended for use only in a horizontal position or with the shaft extension 10 above the horizontal, never with the shaft extension below the horizontal.

A suitable metal cover 19 is secured to the frame 5. This cover surrounds the right hand end of the motor winding 3 and fits around the hub portion 20 of the rotor. The shaft extension 10 projecting beyond the hub portion 20 of the rotor is adaptable for the transmission of power, for example, to operate a fan. The fan or other load can be secured to the shaft extension in any suitable manner, for instance as with threads 21. The machine may be supported in any convenient manner as by bolts engaged in the tapped openings 22 in the end shield 6.

As thus far described, the device of FIG. 1 is intended to be typical of unit-bearing motors. In order to provide the proper lubrication for the bearing 8 which will permit a long and efficient operation of the motor, the improved arrangement now to be described is provided. In this arrangement a lubricant pumping groove 23 is cut or otherwise formed on the shaft 9 at its end remote from shaft extension 10. Also, an undercut portion 24 on the shaft effectively divides the journal surface of the shaft into two portions, thus providing two-point support of the shaft 9 by the bearing. The groove 23 is formed only on the left hand side of the undercut portion. A metal sleeve 25 is secured to an annular portion 26 of the web 7 and surrounds the bearing 8 extending axially to also surround a portion of the shaft extension 10. This sleeve 25 is inturned as at 27 to form a reentrant annular flange surrounding the rotor sleeve 13. A small catching wick 28 extends around the reentrant portion of the sleeve 25 and absorbs lubricant which may be thrown off by the oil slinger 29 which is part of the rotor sleeve portion 13. A plurality of openings 30, are formed in the web portion 7 connecting the reservoir 16 and the space between the sleeve 25 and the outer surface of the bearing 8.

Two identical doughnut shaped reservoir wicks 31 and 32 are positioned in the reservoir 16 as shown in FIG. 1. These reservoir wicks are spaced radially outward from both the retainer 18 and the shaft 9. A washer shaped feeder wick 33 is tightly engaged between the reservoir wicks and bridges the space separating the reservoir wicks from the shaft 9. Another washer shaped feeder wick 34 is tightly pressed against the nose 35 of the bearing 8 and engaged against the shaft 9, substantially continuously about the 360° of its circumference. It will be understood that we have used the word washer in its broader sense herein and that the term includes wicks whose outer configurations are not round. For example, the edges could be cut off of washer wick 33 to make it square.

During assembly the right or inner reservoir wick 31, looking at FIG. 1, is placed in position. Next the feeder wick 34 is positioned around the shaft with its inner face engaged against the nose 35 of the bearing 8 by slipping it over the end of the shaft 9. The feeder wick 34 at this time is in substantially continuous engagement about the entire circumference of the shaft 9. Then feeder wick 33 is positioned over feeder wick 34 and the right hand reservoir wick 31, engaging their outer faces and forming an oil conducting bridge between reservoir wick 31 and feeder wick 34. The retainer 18 is secured to the shaft 9 and then the left reservoir wick 32 is placed over the feeder wick 33 being engaged against its outer periphery and spaced remotely from feeder wick 34 as seen in FIGS. 1 and 2. All of the wicks which we have used are preferably made of felt and they accordingly have a resilient characteristic. Therefore, when they are pressed inwardly and together, i.e., to the right as viewed in FIG. 1, they tend to return to their original condition. Also, when the felt is pressed it has a tendency to push or expand outwardly at those places which are not within rigid bounds. Of course, the wicks could be made of any other suitable wicking material.

When the cover member 15 is secured in position the wicks are pressed to the right or inwardly within the motor. Thus reservoir wick 32 is pressed against feeder wick 33 which is engaged between reservoir wicks 32 and 31 and thereby the wick 33 is urged to the right. As these two wicks are urged to the right by the cover 15 they pull the inner or shaft engaging portion of the feeder wick 33 to the right and tightly against feeder wick 34.

The dimensions of the wicks must be such that the feeder wick 33 is pulled inwardly, which is to the right in FIG. 1. Otherwise the feeder wick 33 might be spaced outwardly away from a pressing engagement with feeder wick 34 thus allowing wick 34 to become spaced outwardly from the nose 35 of the bearing. Such a spacing would cause a gap between the wicks or between the wicks and the shaft adjacent the nose 35. This would tend to interrupt the maintenance of a satisfactory supply of oil to the bearing 8. On the other hand the pressing together and squeezing of the wicks as shown in FIG. 1 avoids any gaps in the continuous contact between the wicks and the shaft at the bearing entrance thus increasing the movement of the oil from the wicks to the bearing.

As the radially inner portion of the feeder wick 33 is pulled to the right it will, practically speaking, always be pulled a little more to one side of the shaft than to the other thus being pulled away from the shaft slightly on the side toward which the greatest pull occurs. If the inner wick 34 were omitted and the outer wick 33 brought directly into contact with the nose 35 of the bearing the feeder wick 33 would buckle up as it was pulled down over the edges of the nose 35. It would thus assume a slight cone or tent over the nose 35 about the shaft 9. This would lead to only edge contact between the shaft and the bore of the wick 33, this edge contact being at only one face of the wick. These tendencies of feeder wick 33 to assume a cone or tent shape are materially lessened when feeder wick 34 is used as compared to when feeder wick 33 is used alone. Furthermore, feeder wick 34 is compressed somewhat as it is forced against the nose 35 by the inward pull of feeder wick 33. Thus, there is some tendency for this feeder wick to expand and press against the shaft 9 as it is urged inwardly. There is also a tendency for feeder wick 34 to expand axially into the beveled entrance 36 of the bearing, thereby insuring good contact between the wick and the shaft at the bearing entrance.

Tests were run with only feeder wick 33 being used and comparisons made with tests under identical conditions but with feeder wick 34 being used in cooperation with feeder wick 33. When feeder wick 33 was used alone we observed that it had a marked tendency, as previously pointed out, to form a cone shape over the nose 35 thus spacing itself outwardly from the nose next to the shaft and contacting the shaft only with the edge of the central bore rather than with the entire wall area of the bore. Also the wick 33 tended to pull away from one side of the shaft. The striking differences in the oil pumped through the bearing can be seen in graphical representation in FIG. 3. The graph shows the results of a typical test run with the wick 34 omitted and with it present. The tests were run with no oil being returned through passageway 30 to the reservoir wicks. During the test the motors were run at 1540 r.p.m. at an ambient temperature of 25° centigrade. The entire lubricating system contained 35 cc. of D 50FM2A oil. The oil temperature during operation was 60° centigrade.

Referring to the graph, FIG. 3, it is apparent that better pumping action is obtained when wick 34 is present whether the motor is in the horizontal or vertical position (lines c and d respectively). Furthermore, it can readily be seen that when the motor is operated in the vertical position (line a) and wick 34 omitted the quantity of oil pumped was very markedly less. In properly lubricating a motor bearing it is not only essential to obtain an adequate film of oil between the bearing and the shaft but it is also necessary to obtain the film rapidly to cut down on the frictional wear and resistance when the motor is first started.

Referring again to the graph, FIG. 3, it may be seen that with the motor operated in the horizontal position 1 cc. of oil is pumped in 15 minutes with wick 34 present (line c) while with wick 34 omitted it takes 30 minutes to pump the 1st cc. of oil (line b). With the motor in the vertical position 1 cc. of oil is pumped in less than 15 minutes with wick 34 present (line d) while only ½ cc. of oil is pumped in 10 hours if wick 34 is omitted (line a). Thus, FIG. 3 shows in graph form the superiority of the wick arrangement including wick 34 in supplying oil to the bearing.

At first it may be surprising to discover that when wick 34 is present a greater amount of oil is pumped through the bearing when the motor is operated in the vertical position than when the motor is operated in the horizontal position. Although we are not sure as to the reason why this phenomenon occurs, one theory which may explain it is that with the motor in the vertical position the saturation of the wicks, after a lapse of time which permits the oil to settle downwardly in the wicks due to gravity, is uniformly fairly high in and around wick 33. On the other hand with the motor in the horizontal position the lower portion of wick 33 would be highly saturated while the percent of saturation at the top of the wick would be the lowest possible, the oil having settled downwardly in the reservoir wicks. Thus in the vertical position the oil in large measure can flow through wick 33 to the bearing from a source of uniformly fairly high saturation, while in the horizontal position wick 33 is drawing oil from areas of low saturation as well as high saturation with the net effect that the combined flow of oil into the wick 33 and to the bearing is reduced. Thus it can be seen that the relationships are quite different throughout the system when the motor is vertical as compared to when the motor is horizontal.

In the operation of our improved bearing lubrication arrangement two reservoir wicks 31 and 32 supply an ample supply of oil for the entire life of the motor. The feeder wick 33 bridges the space between the oil saturated reservoir wick and the bearing 8, while feeder wick 34 provides the optimum feeding of the oil to the bearing. Both of the feeder wicks are saturated with oil before assembly to assure an instant supplying of oil to the bearing. The lubricant pumping groove 23 extends from the retainer 18 to the undercut portion 24. Groove 23 conveys the oil toward the catching wick 28, and the oil is pumped through the bearing 8 by the rotation of the shaft 9. Some of the oil is pumped out of the bearing adjacent the shaft extension 10 and slung by the oil slinger 29 to catching wick 28. The catching wick 28 then feeds it to the inside of the sleeve 25 wherein it flows back to the left as viewed in the drawing. From the right hand end of the sleeve 25 the oil flows by gravity through one of the openings 30 formed in the web 7 back to the reservoir wick 31. Then it is fed back through the feeder wicks to repeat the cycle. It will be understood that if the motor is to be run with the shaft extension 10 pointing below the horizontal a supplementary wick must be added between the catching wick 28 and the reservoir wick 31 to return the oil from the catching wick to the reservoir wick.

It will further be understood that only one reservoir wick need be used, particularly if the reservoir depth does not extend inwardly much beyond the nose of the bearing. But with any modification it is necessary that the feeder wick 33 be drawn down tightly against feeder wick 34 during assembly and that a good supply of lubricant be provided.

It can now be seen that we have supplied a new, improved and highly efficient wicking system for supplying oil in the lubricating system of an electric motor for the entire life of the motor without interruption and without the need for replenishing or adjusting the system during the life of the motor. Our wicking system is simple, yet supplies the bearing with a good supply of oil, which is required if the bearing is to give long motor life.

While in accordance with the patent statutes, we have described what at present is considered to be the preferred embodiment of our invention, it will be obvious to those skilled in the art that numerous changes and modifications may be made therein without departing from the invention and it is therefore aimed in the appended claims to cover all such equivalent variations as fall within the true spirit and scope of the invention.

What we claim as new and desire to secure by Letters Patent of the United States is:

1. In a dynamoelectric machine having a bearing and a shaft rotatably mounted therein, said shaft projecting from said bearing, a lubrication system comprising a wicking washer positioned around said shaft and having one face engaged against one end of said bearing, said washer being engaged against said shaft, a second wicking washer having a greater diameter than the first wicking washer and engaging said first wicking washer on its other face, a reservoir wick pressed against said other face of said second wicking washer and spaced radially outwardly from the periphery of said first wicking washer, said reservoir wick pressing against said second wicking washer and pushing the outer ends of said second wicking washer axially toward said bearing and thereby drawing said first wicking washer into pressing engagement against said one end of said bearing about said shaft and pressing said first and said second wicking washers tightly together.

2. In a dynamoelectric machine having a bearing and a shaft rotatably mounted therein, said shaft being undercut intermediate its ends and journaled by the bearing on both sides of the undercut, at least one oil pumping groove on said shaft extending from one side of the undercut through one of the journaled shaft regions and beyond one end of the bearing, a wicking washer positioned around the shaft and having one face engaged against said one end of the bearing, said washer being engaged against said shaft and said grooves extending from said bearing beyond said wicking washer, a feeder wick engaging the other face of said wicking washer, means drawing the radially outer edges of said feeder wick axially toward said bearing and thereby drawing said wicking washer into pressing engagement against said one end of said bearing about the shaft and pressing said wicking washer and said feeder wick tightly together, and means for supplying lubricating oil to said feeder wick for transfer to said wicking washer, said last mentioned means being spaced from the greatest radial extent of said wicking washer.

3. In combination, a bearing and a shaft rotatably mounted therein, said shaft projecting from said bearing, a first wicking washer around said shaft and engaged against the end of said bearing, said washer being engaged against said shaft, a second wicking washer having outer regions extending radially beyond said first wicking washer and a portion inward of said outer regions engaging the outer face of said first wicking washer, means drawing the outer regions of said second wicking washer radially beyond said first wicking washer in a direction generally toward said bearing for forcing said first wicking washer into pressing engagement against the end of said bearing about said shaft and for pressing said first and said second wicking washers tightly together, and means for supplying lubricating oil to said wicking washers.

4. In combination, a bearing and a shaft rotatably mounted therein, a first feeder wick around said shaft and engaged against one end of said bearing, said first feeder wick being engaged against said shaft, a first reservoir wick spaced remotely from said first feeder wick laterally and being positioned inwardly of the outer face of said first feeder wick and around said one end of said bearing, a second feeder wick engaging the outer face of said first feeder wick and bridging the distance separating said wicks, a second reservoir wick pressed against the outer face of said second feeder wick and spaced remotely from said first feeder wick laterally, said second reservoir wick pressing against said second feeder wick and pushing the outer ends of said second feeder wick inwardly and thereby drawing said first feeder wick into pressing engagement against said one end of said bearing about said shaft and pressing said first and said second feeder wicks tightly together.

5. In combination, a bearing and a shaft rotatably mounted therein, said shaft being undercut intermediate its ends and journaled by the bearing on both sides of the undercut, an oil pumping groove on said shaft extending from one side of the undercut through the journaled shaft region and beyond the one end of the bearing, a first wicking washer positioned around said shaft and engaged against said one end of the bearing, a first reservoir wick spaced remotely from said first wicking washer laterally and being positioned inwardly of the outer face of said first wicking washer and around said one end of said bearing, a second wicking washer having a greater diameter than said first wicking washer and engaging the outer face of said first wicking washer, a second reservoir wick pressed against the outer face of said second wicking washer and spaced remotely from said first wicking washer laterally and overlying said first reservoir wick, said reservoir wicks pressing inwardly and drawing said second wicking washer inwardly and thereby drawing said first wicking washer into pressing engagement against said one end of said bearing about said shaft and pressing said first and said second wicking washers tightly together, and a passageway connecting the other end of said bearing with said first reservoir wick for returning the oil which is pumped from said other end of said bearing to said first reservoir wick.

6. In combination, a bearing and a shaft rotatably mounted therein, said shaft being undercut intermediate its ends and journaled by the bearing on both sides of the undercut, an oil pumping groove on said shaft extending from one side of the undercut through the journaled shaft region and beyond the one end of the bearing, a first wicking washer positioned around said shaft and engaged against said one end of the bearing, said wicking washer being engaged against said shaft substantially continuously throughout its 360° circumference, a first reservoir wick spaced remotely from said first wicking washer laterally and being positioned inwardly of the outer face of said first wicking washer and around said one end of said bearing, a second wicking washer having a greater diameter than said first wicking washer engaging the outer face of said first wicking washer, a second reservoir wick pressed against the outer face of said second wicking washer and spaced remotely from said first wicking washer laterally and overlying said first reservoir wick, said reservoir wicks pressing inwardly and drawing said second wicking washer inwardly and thereby drawing said first wicking washer into pressing engagement against said one end of said bearing about said shaft and pressing said first and said second wicking washers tightly together, an oil slinger surrounding said shaft beyond the other end of said bearing, a sleeve spaced outwardly from and surrounding said oil slinger, a catching wick mounted on the inner surface of said sleeve adjacent said oil slinger, and a passageway connecting said catching wick and said first reservoir wick for returning the oil caught by said catching wick to said first reservoir wick.

References Cited by the Examiner

UNITED STATES PATENTS 2,752,208  6/1956  Wightman _____ 308—132

DAVID J. WILLIAMOWSKY, *Primary Examiner.*

FRANK SUSKO, *Examiner.*